United States Patent [19]

Curtiss

[11] 4,134,036

[45] Jan. 9, 1979

[54] MOTOR MOUNTING DEVICE

[75] Inventor: George R. Curtiss, Chardon, Ohio

[73] Assignee: Cooper Industries, Inc., Houston, Tex.

[21] Appl. No.: 803,159

[22] Filed: Jun. 3, 1977

[51] Int. Cl.$^2$ ............................................. H02K 15/02
[52] U.S. Cl. ....................................... 310/42; 310/216; 310/258
[58] Field of Search .......................... 310/42, 216–218, 310/254, 258, 259

[56] References Cited

U.S. PATENT DOCUMENTS

| 2,632,861 | 3/1953 | Morton et al. | 310/258 |
| 2,885,580 | 5/1959 | Scanlon et al. | 310/258 |

Primary Examiner—Donovan F. Duggan

Attorney, Agent, or Firm—Barker, Emch, Schaffer & Todd Co.

[57] ABSTRACT

A device for mounting an electric motor stator within an outer housing is disclosed. The mounting structure comprises a longitudinally convoluted hollow metal cylinder having three longitudinal plates attached at 120° intervals to its outer wall. The cylinder is sized to provide an interference fit with the stator and the convolutions permit sufficient diametral expansion to facilitate assembly and tight retention of the stator when placed within the cylinder. The cylinder/stator assembly is retained in the outer housing by a plurality of bolts which pass through the outer housing and engage threaded openings in the longitudinal attachment plates secured to the outer cylinder surface.

9 Claims, 4 Drawing Figures

MOTOR MOUNTING DEVICE

BACKGROUND OF THE INVENTION

The invention relates to an electric motor mounting structure and more specifically to a convoluted metal cylinder which is press fit circumjacent the electric motor stator and which is in turn mounted into an outer motor housing.

An electric motor generally comprises a rotor, stator, windings, bearings and an outer housing. When the motor is activated and delivering power, a torque equal in magnitude but opposite in direction to that produced by the rotor is produced in the stator and this reaction torque must be transferred from the stator to the outer housing and thence to an external support which may be a mounting plate or, in the case of a hand-held tool, the operator. The stator must be positively retained in the outer housing in order to transfer the reaction torque to it and to the external support. In industrial electrical motors which develop substantial torque, and an equally substantial reaction torque, consideration must be given to providing a stator mounting which will withstand the reaction torque loading. The retention means must be capable of transferring a reaction torque equal to the maximum torque the motor is capable of generating to the outer housing, or the stator may break away from the internal retention means. If the stator rotates inside the housing, damage to the internal wiring will invariably occur and the operator may be subjected to a shock hazard. In practice, a substantial margin of safety between the torque which the retention means is capable of resisting and the torque which the motor is capable of producing is incorporated into the design of the stator retaining structure.

Various stator and outer housing interconnecting configurations have been utilized. Attempts to mount the stator directly to the outer housing with bolts or other fasteners proved unsuccessful since this required the drilling and tapping of threaded openings in the stator which were engageable by the fasteners. The openings created discontinuities in the magnetic circuit of the stator and had a deleterious effect on the performance of the electric motor. A loss of power accompanied by overheating resulted from this type of stator mounting.

Another prior art approach required that the stator be produced with a plurality of longitudinal outwardly projecting ribs around its circumference which mated with a like number of equally spaced longitudinal channels on the inner wall of the outer housing. This structure facilitated slip-in assembly and had the advantage of uniformly distributing the reaction torque around the housing. However, this design required that the housing undergo numerous expensive machining operations to prepare it to receive the stator. Such a structure is becoming increasingly unfeasible from an economic standpoint.

SUMMARY OF THE INVENTION

The instant invention comprises a longitudinally corrugated or convoluted metal cylinder. The inside diameter of the cylinder and the outside diameter of the stator are such that the cylinder is an interference fit on the stator. The longitudinal convolutions allow resilient diametral expansion of the cylinder. When the cylinder is assembled to the stator, the interference fit between it and the stator results in the cylinder being placed in tension. The tensioned cylinder is thus tightly retained on the peripheral surface of the stator. A plurality of longitudinal keys or ribs on the outer surface of the stator fit within a like number of convolutions on the cylinder. This relationship further assists in the retention of the cylinder on the stator and prevents the rotation of the stator relative to the cylinder. Equally spaced around the cylinder and mounted on its outer surface are three longitudinal mounting plates. The plates each have two threaded mounting holes which align with similarly positioned openings in the outer protective housing of the motor assembly. The diameter of the circle defined by the outer surfaces of the mounting plates is slightly less than the inner diameter of the outer housing. Thus the assembled stator and cylinder may be easily slid into and out of the housing. The stator assembly is retained in the outer housing by bolts which pass through the openings in the outer housing and engage the threaded openings in the mounting plates.

Thus it is the object of this invention to provide a simplified, novel device for mounting an electric motor stator in an outer housing.

It is a further object of this invention that the stator mounting device be capable of withstanding substantial reaction torque such as is generated by industrial equipment.

It is a still further object of this invention to provide a stator mounting device which facilitates the rapid disassembly, removal and reassembly of the stator in the housing for inspection and repair of the electric motor.

DESCRIPTION OF THE PREFERRED EMBODIMENT

Figure 1:
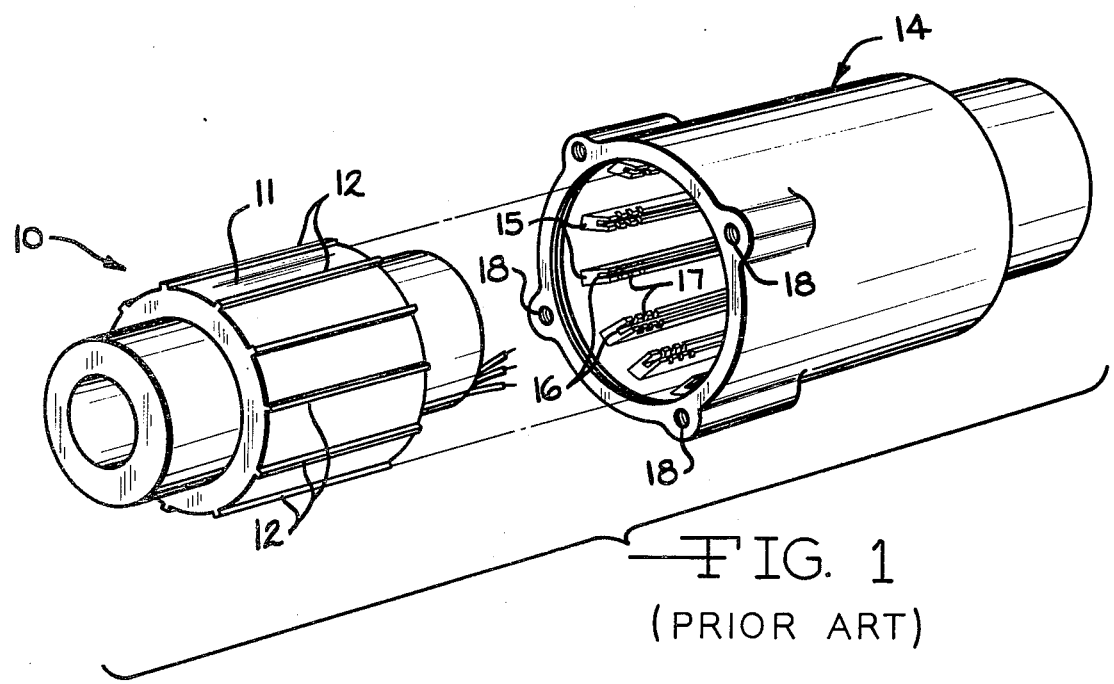
FIG. 1 is an exploded perspective view of a prior art motor housing and stator.

Referring now to FIG. 1, a prior art configuration of an electric motor 10 having a stator 11 and an outer housing 14 is illustrated. The motor stator 11 includes a plurality of longitudinal keys, ribs or projections 12 disposed at equal intervals around the periphery of the stator 11. The outer housing 14 is a bell-like casting, which may be fabricated of aluminum or other lightweight, high strength material. The housing 14 has a plurality of longitudinal supports 15 on its inner surface, each including a longitudinal channel 16. There are an equal number of projections 12 and supports 15 and the channels 16 are radially located to accept the projections 12 on the motor stator 11. The engagement of the projection 12 and the supports 15 secures the motor stator 11 in the outer housing 14 and prevents relative rotation between the housing 14 and the motor stator 11. After the stator 11 is in place in the housing 14, an annular retaining ring (not shown) may be positioned in circular grooves 17 in order to prevent relative axial motion between the motor stator 11 and the housing 14. The housing 14 further includes threaded openings 18 which are utilized to attach the housing 14 to the remainder of a tool (not shown). This prior art mounting configuration necessitates the casting of a metal housing which requires subsequent precision machining.

Figure 2:
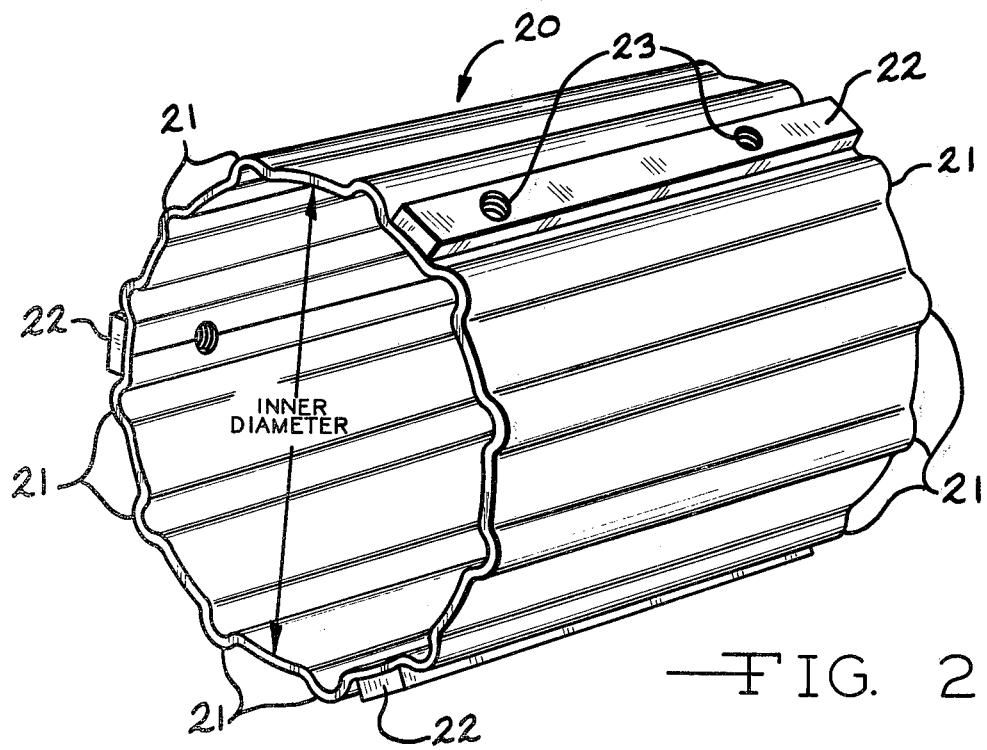
FIG. 2 is a perspective view of a stator mounting device of the present invention.
Figure 3:
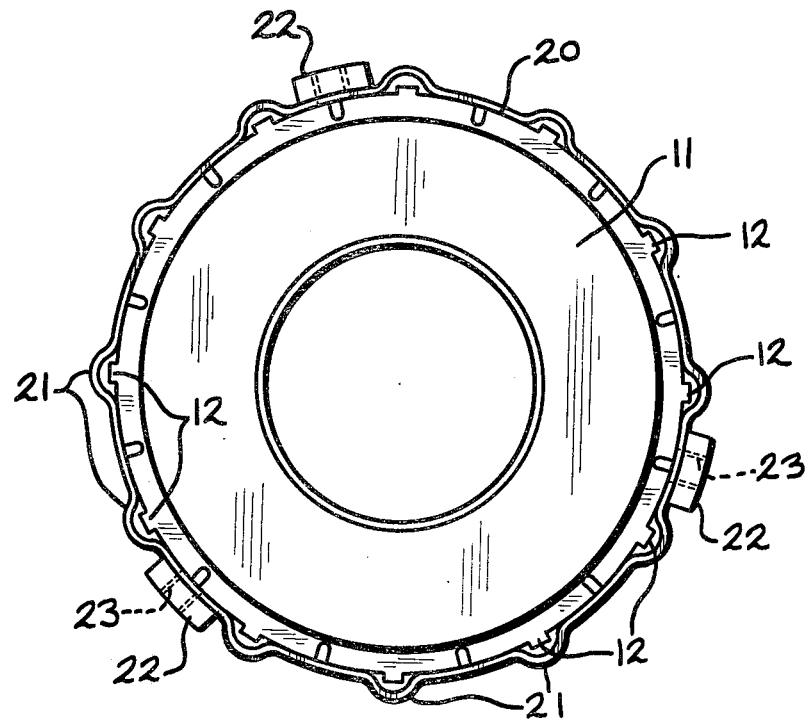
FIG. 3 is an axial plan view of a stator mounting device of the present invention in place on a stator.

Referring to FIG. 2, the motor mounting device of the present invention is illustrated. It comprises a metal annulus or cylinder 20 which includes a plurality of longitudinally oriented convolutions 21. The convolutions 21 take the form of longitudinal arcuate indentations in the inner surface of the cylinder and aligned, longitudinal arcuate projections on the outer surface of the cylinder 20. The number of convolutions 21 is equal to the number of projections 12 on the periphery of the motor stator 11 and the depth of the indentations relative to the undisturbed circular diameter of the cylinder is sufficient to provide clearance for the projections 12 on the periphery of the stator 11 as is illustrated in FIG. 3. The cylinder 20 may be formed of a single plate of metal, such as 16 gauge steel. The convolutions 21 are formed in the metal plate which is subsequently rolled into the cylindrical shape illustrated and the adjacent ends may be butt welded or connected by the procedure explained in the following paragraph.

Affixed to the outer surface of the cylinder 20 are three longitudinally oriented attachment plates 22. The plates 22 are spaced at 120° intervals around the outer surface of the cylinder 20 and may be attached by welding or other permanent attachment methods known in the art. The attachment plates 22 include radially disposed threaded openings 23 which pass through the attachment plates 22 and the cylinder 20. Although three attachment plates 22 each containing two threaded openings 23 are illustrated in FIG. 2, it should be understood that the number of plates 22 and threaded openings 23 is dictated by such considerations as the torque output of the electric motor 10 and standard fastener sizes and may vary from application to application. Therefore, the use of two threaded openings 23 in each of three attachment plates 22 is merely illustrative and should not be construed as a limitation of the instant invention.

Referring now to FIG. 3, the convoluted cylinder 20 is shown in place on the motor stator 11. The cylinder 20 is retained on the motor stator 11 by virtue of a substantial interference fit between the stator 11 and cylinder 20. As illustrated in FIG. 2, the inner diameter of a typical cylinder 20 may be approximately 3 inches. This inner diameter may be 0.025 inches to 0.030 inches smaller than the outer diameter of the stator 11. The cylinder 20 must therefore be expanded slightly to fit over the stator 11. The convolutions 21 allow sufficient diametral expansion of the cylinder 20 to facilitate its positioning about the stator 11. Because of the convolutions, the stresses generated by the diametral increase in the cylinder 20 do not exceed the tensile yield point of the metal and the cylinder 20 will contract about the stator 11 and retain it securely.

Figure 4:
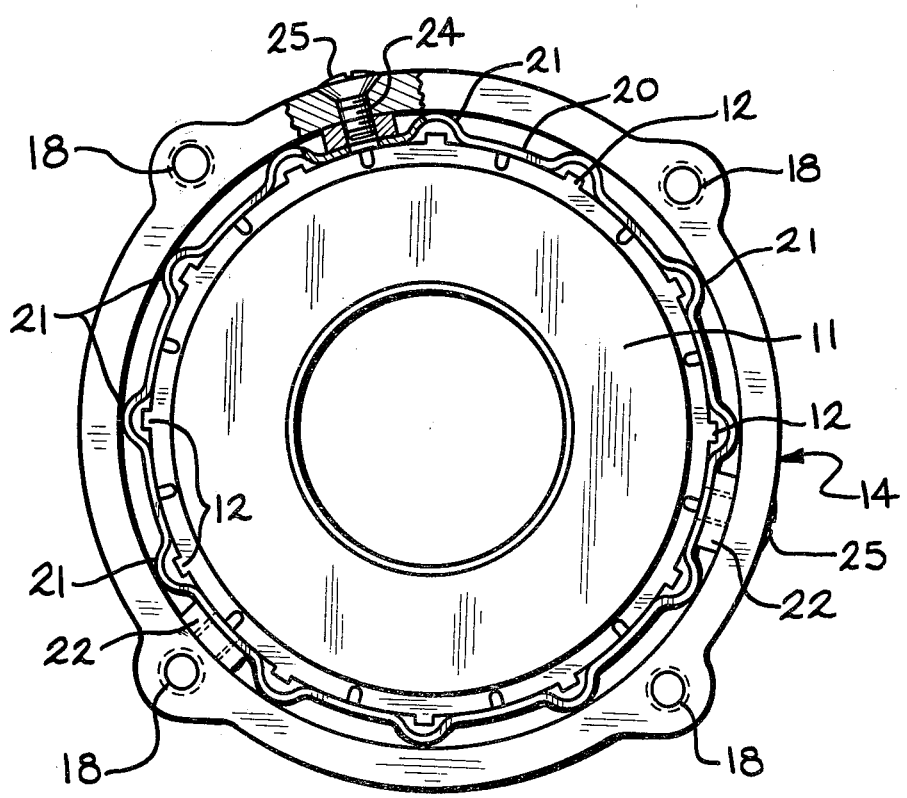
FIG. 4 is an axial plan view of a stator mounting device of the present invention in place on a stator and mounted in an outer motor housing.

Referring now to FIG. 4, the assembled stator 11 and cylinder 20 are shown installed in the outer housing 14. The inner surface of the outer housing 14 is cylindrical and does not contain any supports or grooved channels as do prior art housings. The diameter of the circle defined by the outer surface of mounting plates 22 is smaller than the inner diameter of the outer housing 14 thereby facilitating a slide-in fit of the cylinder 20 and stator 11 in the outer housing 14.

The outer housing also contains a plurality of radially oriented openings 24 which align with threaded openings 23 in mounting plates 22 when the cylinder 20 is properly axially positioned within the housing 14. The openings 24 may be countersunk as illustrated and a plurality of suitable threaded fasteners 25 is used to engage the threaded openings 23. As the fastener 25 is tightened, the attachment plate 22 will be moved radially outwardly until it is in intimate contact with the inner surface of the outer housing 14. The stator 11 is thus tightly secured in the outer housing 14.

The deformation of the cylinder 20 caused by the outward movement of the attachment plates 22 does not materially loosen the friction fit of the cylinder 20 on the stator 11. Furthermore, the mating projections 12 and convolutions 21 prevent relative motion between the stator 11 and the cylinder 20, not merely the friction fit therebetween.

It can also be appreciated that removal of the electric motor 10 from the housing 14 is also facilitated by the instant invention. The removal of the threaded fasteners 24 and the fasteners (not shown) which engage threaded openings 18 and attach the housing 14 to the remainder of the machine, are the only steps required to slide out the motor 10 for inspection or replacement.

It will be apparent to those skilled in the art that various modifications may be made to the preferred embodiment described above without departing from the spirit and scope of the following claims.

What I claim is:

1. A device for securing an electric motor within an outer housing defining at least one radial opening, comprising a longitudinally convoluted annulus substantially equal in length to the stator of the electric motor and having at least one longitudinal plate affixed to the outer surface of said annulus, said plate defining at least one radial opening engageable by a fastener passing through such one opening in such outer housing.

2. A device for securing a stator of an electric motor having a plurality of longitudinal ribs on its outer surface in an outer housing comprising, in combination, a longitudinally convoluted cylinder substantially equal in length to the motor stator and having at least one longitudinal attachment plate affixed to the outer surface of said cylinder, said attachment plate including at least one threaded opening engageable by a threaded fastener passing through an opening in the outer housing, whereby said fastener engages said threaded opening in said attachment plate and secures said cylinder to the outer housing.

3. A device for securing a stator of an electric motor having a plurality of longitudinal parallel projections on its outer surface within an outer housing comprising, in combination, a cylinder having a plurality of longitudinal parallel convolutions engaging the plurality of projections on the outer surface of the motor stator, said cylinder being substantially equal in length to the motor stator and having at least two longitudinal attachment plates affixed to its outer surface, said attachment plates being spaced about said cylinder and each including at least one threaded radially disposed opening engageable by a threaded fastener, said fastener passing through a radial opening in the outer housing and engaging said threaded opening in said attachment plates, whereby said cylinder and the electric motor stator are secured within the outer housing and whereby relative rotation between the electric motor stator and the housing is prevented.

4. The stator securing device of claim 3, wherein said cylinder includes three longitudinal attachment plates affixed to its outer surface.

5. The stator securing device of claim 3, wherein said longitudinal attachment plates are substantially equally spaced about said cylinder.

6. A device for securing a stator of an electric motor having a plurality of longitudinal parallel projections on its outer surface within an outer housing comprising, in combination, a cylinder having a plurality of longitudinal convolutions engaging the plurality of projections on the outer surface of the motor stator, said cylinder being substantially equal in length to the motor stator and having three longitudinal attachment plates affixed to its outer surface, said attachment plates being equally spaced about said cylinder and each including two threaded radially disposed openings engageable by threaded fasteners, said fasteners passing through radial openings in the outer housing and engaging said threaded openings in said attachment plates, whereby said cylinder and the electric motor stator are secured within the outer housing and whereby rotation of the electric motor stator relative to the housing is prevented.

7. A device for securing an electric motor within an outer housing defining a plurality of openings comprising, in combination, a longitudinally convoluted annulus having a plurality of attachment plates secured to the outer surface of said annulus, and fastener means for engaging said attachment plates through such openings in such outer housing.

8. The device of claim 7 wherein such electric motor includes longitudinally oriented ribs on its outer surface.

9. The device of claim 7 wherein said plurality of attachment plates are substantially equally spaced around said annulus.

* * * * *